United States Patent [19]
Marmol et al.

[11] Patent Number: 4,981,415
[45] Date of Patent: Jan. 1, 1991

[54] SUPPORT FOR OIL FILM DAMPERS

[75] Inventors: Ronald A. Marmol, Palm Beach Gardens, Fla.; Walter E. Wojcicki, Nashville, Tenn.

[73] Assignee: United Technologies Corporation, Hartford, Conn.

[21] Appl. No.: 394,704

[22] Filed: Aug. 16, 1989

[51] Int. Cl.⁵ .................... F01D 11/00; F16C 27/00
[52] U.S. Cl. .................. 415/174.2; 415/231; 416/174; 384/99; 384/215
[58] Field of Search ............ 415/119, 129, 131, 132, 415/133, 171.1, 174.2, 229, 230, 231; 416/174; 384/99, 215

[56] References Cited

U.S. PATENT DOCUMENTS

| | | | |
|---|---|---|---|
| 2,858,173 | 10/1958 | Leibach | 384/99 |
| 4,213,661 | 7/1980 | Marmol | 384/99 |
| 4,605,316 | 8/1986 | Utecht | 384/99 |
| 4,772,135 | 9/1988 | Griguscheit | 384/99 |

FOREIGN PATENT DOCUMENTS

| | | | |
|---|---|---|---|
| 3728039 | 3/1989 | Fed. Rep. of Germany | 384/99 |
| 1160146 | 6/1985 | U.S.S.R. | 384/99 |

*Primary Examiner*—Edward K. Look
*Assistant Examiner*—Hoang Nguyen
*Attorney, Agent, or Firm*—Norman Friedland

[57] ABSTRACT

A relatively less complex segmented spring mounted under the bearing and damper or the same configuration segmented spring mounted on either side of the bearing and damper serves to center the shaft of a rotor of a gas turbine engine and is characterized as being simple, occupying minimum space, but being capable of maintaining an adequate fatigue stress margin.

5 Claims, 2 Drawing Sheets

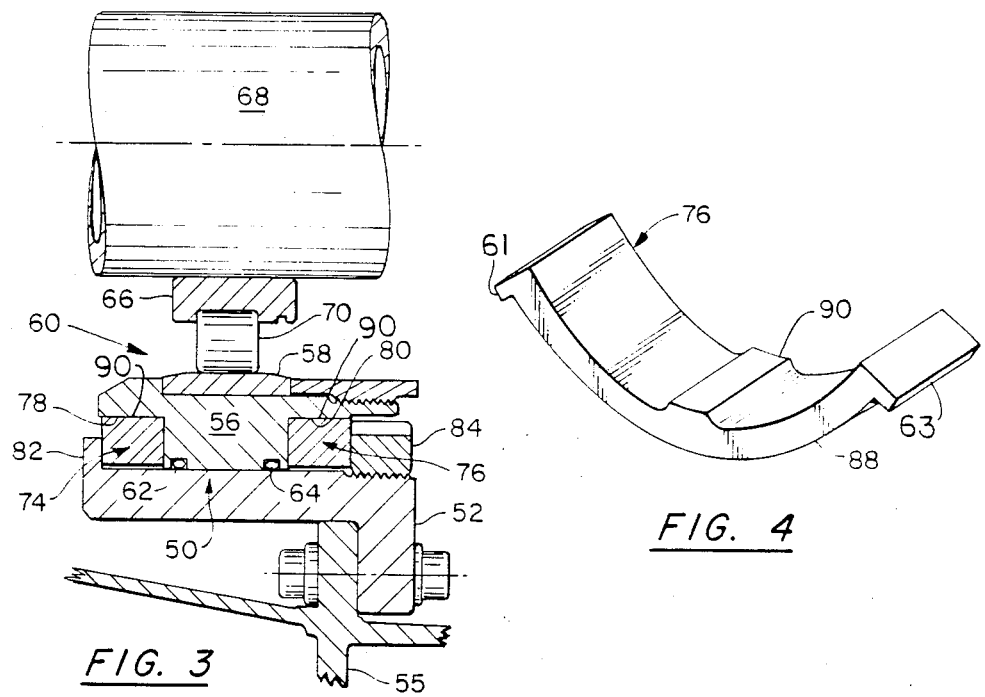
FIG. 3
FIG. 4
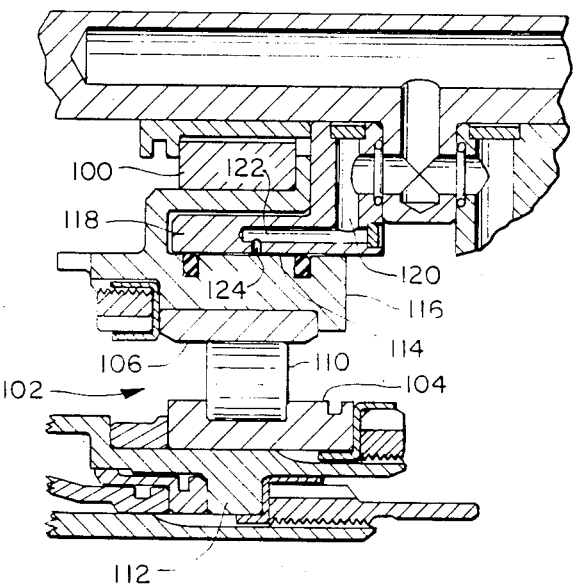
FIG. 5

SUPPORT FOR OIL FILM DAMPERS

The invention was made under a U.S. Government contract and the Government has rights therein.

TECHNICAL FIELD

This invention relates to fluid dampers for a bearing supporting a shaft for damping cyclical transverse orbital movement of a non-rotating cylindrical body occasioned by the rotating shaft supporting the compressors and turbines of a gas turbine engine and particularly to the spring support for centering the bearing.

BACKGROUND ART

The use of springs for centering shafts that are co-supported by fluid dampers are well known and, as for example, the spring exemplified in U.S. Pat. No. Re. 30,210 granted to D. F. Buono, N. G. Carlson, D. H. Hibner and D. C. Moringiello on Feb. 12, 1980 and commonly assigned to United Technologies Corporation, the assignee of this patent application, is typical of the prior art. As disclosed in this reissue patent, the spring is mounted coaxially with the shaft and extends axially relative to the bearing so that it is fixed at one end and attached to the bearing on its remote end thus forming a cantilever support.

U.S. Pat. No. 4,213,661 granted to R. A. Marmol (co-inventor of the invention presented in this patent application) on July 22, 1980 and likewise commonly assigned to United Technologies Corporation, discloses another type of bearing support that has heretofore incorporated a spring that circumscribes the bearing and is comprised of several arcuate segments each of which defines fluid chambers for effectuating film squeeze damping. One of the segments of this type of spring is disclosed in FIG. 1 (prior art) to illustrate the complexity thereof and differentiate it relative to the present invention. As noted, the outer surface is grooved to form an ellipse to accept an "O" seal. Fluid is introduced adjacent the surface bounded by the "O" seal. The surfaces of the segment, the inner surface and outer surface, are matched to their respective mating parts necessitating machining each surface to different center lines. Obviously, to assure minimal leakage, the tolerances must be extremely low necessitating lap fittings. In addition, each segment must be individually fed with supply oil. Obviously, the cost of fabricating these types of supports is significant.

The present invention occupies a shorter axial envelope and avoids the disadvantages of the arcuate segmented load supports enumerated in the above. We have found that we can provide a spring support for a bearing by disposing a pair of arcuate segments on either side of, or a single set of arcuate segments surrounding, the bearing, thus permitting the use of an annular fluid chamber that is continuously fed with supply oil. The spring contemplated by this invention absorbs as high a load imbalance as that capable of being absorbed by the support structure exemplified in the prior art.

DISCLOSURE OF INVENTION

The present invention serves to center the shaft of a gas turbine engine by utilizing segmented arcuate spring(s) mounted on either side of, or surrounding, the bearing rotatably supporting the shaft. Fluid annular damper surrounds the bearing and is bounded on either side of, or surrounded by, the spring(s).

A feature of this invention is that the arcuate spring is relatively inexpensive to manufacture and fits into a relatively short envelope.

A further feature of the arcuate spring is that it is sufficiently flexible so that it can withstand substantially high loads that are occasioned by an unbalance of the rotor being supported.

A still further feature of this invention is that the spring is characterized by being durable and is capable of maintaining an adequate fatigue stress margin, even though it has a relatively short axial expanse.

The foregoing and other features and advantages of the present invention will become more apparent from the following description and accompanying drawing.

BRIEF DESCRIPTION OF THE DRAWING

FIG. 3 is a partial view in section illustrating the spring centering members in conjunction with a fluid damper of the type illustrated in FIG. 2.

FIG. 4 is a perspective view of a segment of the centering spring of FIG. 3.

FIG. 5 is a partial view in section exemplifying another embodiment of this invention.

BEST MODE FOR CARRYING OUT THE INVENTION

Figure 1:
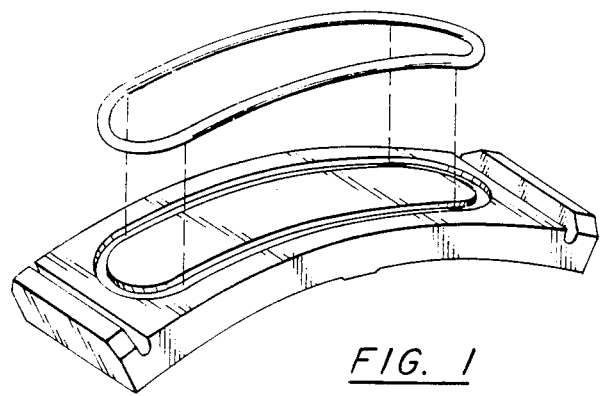
FIG. 1 is an exploded perspective view illustrating one of the segments of the load support of the type that may be employed in the structure disclosed in the U.S. Pat. No. 4,213,661 patent supra.
Figure 2:
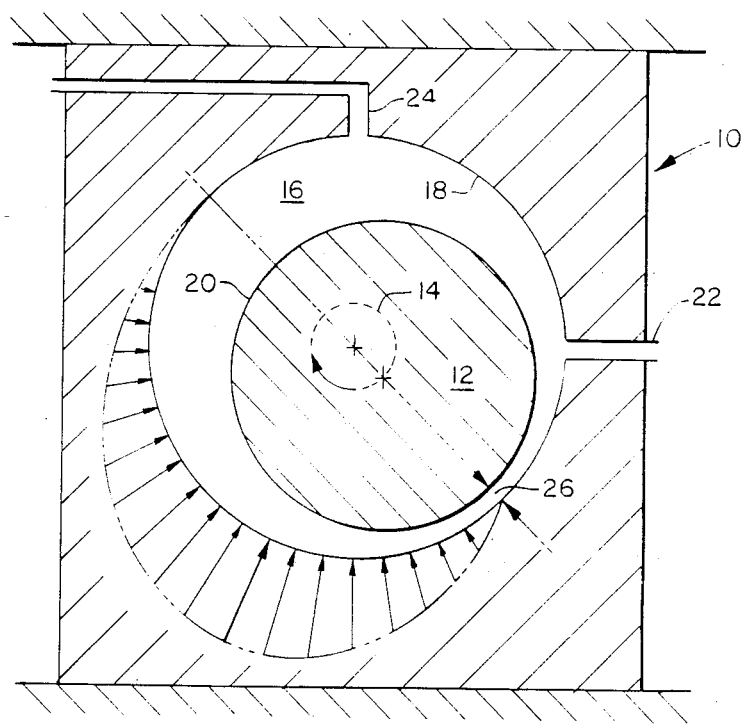
FIG. 2 shows a cross-sectional view normal to the axis of rotation of an annular damper of the type utilized with the present invention.

Reference is made to FIGS. 2 and 3 which show a portion of a typical fluid damper comprising support housing 10 disposed about a cylindrical internal member 12 which is subject to attempted cyclical orbital motion 14. Cylindrical member 12 is the non-rotating bearing sleeve, hereinafter referred to as the sleeve 12. A flow of damping fluid is introduced into the annular volume 16 formed between the inner surface 18 of the support member 10 and the outer surface 20 of the sleeve 12 via supply conduit 22.

The fluid fills the annular volume 16, eventually exiting through a vent opening 24 also disposed in the support 10. During operation, the damper thus described absorbs the momentum of the sleeve 12 through hydrodynamically created forces resulting from the presence of the damping fluid in the annulus 16.

As is well known, the orbital motion 14 of the sleeve 12 causes a circumferential pressure wave to be propagated around the support member surface 18 in advance of the orbiting line of closest approach 26 between the sleeve 12 and the support 10. The local fluid pressure reaches a maximum at a point in advance of the orbiting sleeve 12, thereby exerting a substantial radial and tangential opposing force on the sleeve 12 and preventing undesirable contact between the sleeve 12 and support surfaces 20, 18. A local region of relatively low pressure also trails the sleeve 12, with the resulting radial and tangential pressure imbalances, acting to limit radial movement and to damp the magnitude of the orbital motion 14 of the sleeve 12, translating the absorbed tangential momentum into heat energy within the damping fluid. The continuous renewal of the fluid within the annulus 16 from supply conduit 22 is essential to the continued operation of such dampers.

The vent 24 opens into a low pressure scavenge area or the like wherein the vented damping fluid is collected for subsequent cooling, other usage, or recycle. Such low pressure venting, which is extremely simple to implement, reduces the local fluid pressure within the annulus 16 as the rotating pressure zone passes adjacent to the vent opening 24.

As is apparent from the foregoing, the squeeze film damper consists of an annular chamber that is constantly being filled with pressurized oil supporting the orbiting member 12. To utilize this type of damper in an environment that requires mechanical means to support and center the shaft where the envelope is limited, necessitates a mechanical spring that would be capable of withstanding the high stress levels without fatiguing. In heretofore designs, as mentioned above, the hairpin centering spring, which has a significantly large axial expanse, afforded the required fatigue stress margins.

In a preferred embodiment as depicted in FIGS. 3 and 4, the oil film damper generally indicated by reference numeral 50 comprises the annular fixed support 52 suitably bolted to the engine support structure 55 that defines a cylindrical surface. The orbital member 56 is supported between the outer race member 58 of bearing 60 and the support structure 52. The fluid is admitted between the inner surface of support structure 52 and outer surface of member 56 between the "O" rings 62 and 64 The bearing 60 carries a suitable inner race 66 mounted adjacent the shaft 68 and a plurality of rollers 70 (only one being shown). The fluid squeeze film damper and bearing are conventional and for more details reference should be made to the patents referenced above and the F100 engine manufactured by Pratt & Whitney, a division of United Technologies Corporation.

According to this invention a pair of centering springs 74 and 76 are mounted about the outer face of bearing 60 and sandwich the orbiting member 56 which is recessed to define annular spaces 78 and 80 to accommodate the springs. This assembly is retained in position by the upstanding flange 82 formed on the end of member 52 and locked into position by locking nut 84 threaded to the inner diameter of member 52.

Both springs 74 and 76 are identical and each consists of segmented curve beams 88 oriented in a circumferential direction. In this embodiment, five segments are required to circumscribe the orbiting member 56. An inward facing projection or land 90 is disposed on the inner diameter intermediate the ends of each of the segments 88 and abuts against the outer surface of the adjacent orbiting member 56. An outward projecting portion or lands 61 and 63 are disposed on the outer diameter of curve beam segment 88 at either end and bear against the inner diameter surface of support structure 52. From the foregoing, it is apparent that the spring bears against members 56 and 52 at selected points about the circumference allowing the spring to deflect so as to absorb the energy attendant the vibration associated with the rotor. In the static condition, the spring serves to center the shaft and as is typical the loads are normally supported by the fluid film when the rotor attains its operating speed.

In actual test of this configuration, the damper incorporating the present invention reduced turbine vibrations by more than 60% when compared to the identical test conducted with a rigidly mounted bearing.

Another preferred embodiment is depicted in FIG. 5 showing the arcuate segmented spring 100 supported to circumscribe the bearing generally indicated by reference numeral 102. The bearing is comprised of the inner ring 104 defining the inner race and the outer ring 106 defining the outer race. A plurality of roller bearings 110 (only one being shown) are spaced circumferentially around shaft 112 being supported by the bearing.

The fluid damper 114 consisting of an annular oil filled space between the inner surface of orbital support member 116 and the cylindrical outer surface of the fixed cylindrical support 118. Fluid feed drilled passages 120, 122 and 124 serve to continuously fill the annular space of fluid damper 114.

The orbital member 116 carries an annular extending portion that surrounds the fluid damper and supports the arcuate segmented spring 100. The spring 100 is designed essentially similar to the spring 76 of FIGS. 2 and 3 and is fabricated from five segments similar to element 88 to circumscribe the bearing 102. In this instance a simple spring is utilized instead of the two axially spaced springs as depicted in FIG. 2.

Although this invention has been shown and described with respect to detailed embodiments thereof, it will be understood by those skilled in the art that various changes in form and detail thereof may be made without departing from the spirit and scope of the claimed invention.

We claim:

1. For a shaft having bearing means being supported in operation by a fluid damper having a uniform circumferential sealed fluid chamber being supplied pressurized fluid circumscribing said bearing means, a segmented ring-like spring mounted adjacent to and in juxtaposed relationship with said fluid damper and being in serial load relationship so as to center said shaft and providing support for increased loads that overcome the support of said fluid damper, a housing having an annular surface supporting said segmented ring-like spring and said fluid damper, each segment of said segment having a pair of outwardly protruding loads disposed at either end thereof and an inwardly protruding load adapted to bear against said bearing means and said annular surface, each of said segments being disposed intermediate into ends resilient and flexible to support said increased loads and each segment disposed in end-to-end relationship to define a ring circumscribing said bearing means and said fluid damper.

2. For a shaft as in claim 1, further comprising an outer race for said bearing means, a concentric stationary member defining a cylindrical surface, an orbital member disposed between said outer race and said concentric stationary member, and said sealed fluid chamber being disposed between said concentric stationary member and said orbital member and acting over a portion of said cylindrical surface.

3. For a shaft as in claim 2 in which said land bears against said orbital member.

4. For a gas turbine engine having a rotatably mounted shaft supporting the compressor and turbine rotor of said engine including bearing means supporting said shaft, said bearing means including an outer race and an orbiting member circumscribing said outer race said shaft being supported in operation by a fluid damper having a uniform circumferential sealed fluid chamber being supplied pressurized fluid circumscribing said bearing means, a fixed support having an annular surface, arcuate segments disposed into and defining a pair of ring-like springs mounted adjacent said fluid damper and being in serial load relationship so as to center said shaft and providing support for increased loads overcoming the support of said fluid damper, each of said segments having a pair of outwardly projecting loads extending from either end and adapted to bear against said annular surface, and an inwardly protruding land adapted to bear against said orbiting member each of said segments being resilient and flexible to support said increased loads, said pair of ring-like springs being disposed in side-by-side and sandwiching said fluid damper.

5. For a gas turbine engine as claimed in claim 4, wherein said segmented ring-like springs are disposed coaxially with said bearing means and said fluid damper.

* * * * *